Patented Jan. 6, 1953

2,624,677

UNITED STATES PATENT OFFICE 2,624,677

ICE CREAM CONTAINING MODIFIED GELOSE COMPOUND

Victor Charles Emile Le Gloahec, Rockland, Maine, assignor to Algin Corporation of America, New York, N. Y., a corporation of Delaware No Drawing. Original application January 8, 1946, Serial No. 639,915. Divided and this application June 1, 1950, Serial No. 173,475

2 Claims. (Cl. 99—136)

This invention relates to milk products containing modified gelose compound, and it relates particularly to milk products containing the compound which is the product of reaction between certain alignates and caseinates and gelose so modified as to be of increased reactivity as compared with gelose as ordinarily recovered from marine plants. This application is a division of my application Serial No. 639,915, filed January 8, 1946 for "Alginous Products and the Manufacture Thereof" (Patent No. 2,543,699).

Algin is a complex organic substance contained in various seaweeds such as Laminaria, Phaeophyceae, Macrocystis, Nereocystis and the like. Algin may be recovered from seaweed in several different ways and may, for example, be recovered in a high state of purity according to the method described in Patent No. 2,128,551, applied for by the applicant jointly with John Robert Herter. Pure algin is soluble in distilled water but is precipitated if sufficient acid is added to an algin solution. Precipitated algin can be dissolved by adding an alkali. Due to this fact algin is sometimes referred to as alginic acid and soluble alginate. I will refer herein to the material in question by the term "algin," which is the term most generally used in the art. In the presence of certain metal salts, e. g., calcium salts, algin forms insoluble metal-organic compounds and such compounds are referred to herein as the alginates of the metals. Algin is used extensively for a variety of purposes such as a stabilizer, a sizing material, etc., and is a well-known article of commerce.

As distinguished from algin, which has remarkable stabilization and viscosity imparting characteristics, there is another complex substance which is referred to herein as "gelose" and which possesses the property of inducing gelation, the action being similar to gelatine in this regard. Gelose is recovered from certain varieties of marine plants of the species *floridea*, particularly those of the Gigartinacea family. The number of marine plants from which gelose may be extracted is considerable and some varieties can be found almost anywhere along the American, European or Asiatic coast lines. Examples of such marine plants are *Chondrus crispus, carragheen* (Irish moss), *Fucus crispus, Gigartina pistilla, Gigartina mamillosa, Gracillaria lichenoide, Gelidium corneum,* and *Gelidium cartilagineum*. The recovery of gelose from such marine plants can be accomplished in several ways, the simplest being the extraction of the marine plants with boiling water and then separating the cellulosic matter from the dissolved gelose by filtration or by any other suitable separation procedure. The resulting aqueous extract can be treated to remove water, or the gelose contained therein can be coagulated by means of alcohol. In either event the desired gelose material can be recovered. Gelose is water soluble and has the property of producing reversible gels and is similar in this property to the corresponding property of gelatine, as mentioned above. The gelose material has been given names other than gelose, such as vegetable gelatin, gelosin, and carragheen. It has also been suggested that this substance be referred to as delta galactan, the prefix delta being used to distinguish from what is strictly speaking a sugar and from the alpha, beta or gamma galactans. However, the name "gelose," which name was given to the material by the scientist Payen, is the scientific designation most generally accepted, and, for this reason, this name is used herein to identify broadly the material found in and recovered from the types of marine plants referred to.

The difference between algin, on the one hand, and gelose, on the other hand, may be brought out by the following considerations. As mentioned above, pure algin is soluble in water, whereas calcium alginate is insoluble. Gelose, however, as recovered from marine plants, is water soluble notwithstanding that gelose is a calcium compound, which at the present time is believed to be a polysaccharide ethereal sulphate of calcium. It is also designated at times under the name of calcium carragheen sulphate, and one could represent it by the following formula:

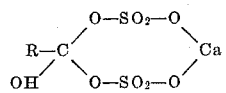

wherein R is a long chain radical the exact nature of which has not been definitely determined.

It is a purpose of this invention to provide milk products comprising a new complex metal-organic compound which has stabilizing properties as good as or superior to algin but which is free from certain of the disadvantages and drawbacks incident to the use of algin.

Algin as ordinarily produced has the disadvantage of being sensitive to certain chemical reagents such as traces of metallic or alkaline earth salts in solution, acid aqueous media, or concentrated salt solutions, all of which, according to their concentration, tend to act as gelling or coagulating agents. Due to the extreme sensitivity of algin to such chemical reagents, the field of utility of algin is correspondingly reduced. For example, milk, which contains less than about 0.3% of ionizable calcium salts, causes algin to coagulate. Algin is likewise sensitive to degradation with decided loss in its desired viscosity inducing properties under the influence of heat or under the influence of acidic media.

It is a feature of the present invention that a new alginous product is afforded which, as compared with algin, has much greater resistance to coagulation due to the presence of metals or alkaline earths or due to the presence of acid and which has increased resistance to degradation under the influence of heat or acidic media.

More particularly it is a feature of this invention to provide improved milk products, e. g. ice cream mixes, by the incorporation therein of the gelose calcium alginate product of reaction between calcium alginate and gelose modified by removing the calcium cation of gelose and replacing in the gelose residue a cation selected from the group consisting of sodium, potassium, ammonium and hydrogen. According to my invention milk products can be stabilized very effectively by the incorporation of the above mentioned product of reaction while overcoming the disadvantages and drawbacks incident to attempting to use algin for a similar purpose. While the foregoing constitutes the preferred embodiment of my invention, certain of the advantages of my invention may also be obtained in the case of milk products containing the product of reaction between a substance selected from the group consisting of alginates and caseinates of the alkaline earth and heavy metals and gelose modified by the removal of the calcium of the gelose and substitution in the gelose residue of a cation selected from the group consisting of sodium, potassium, ammonium and hydrogen.

I have found that algin and gelose can be induced to react to form the new compound of this invention by first modifying the gelose so as to eliminate the calcium cation with replacement in the gelose residue of a cation having less affinity for the gelose residue than the calcium. If the so modified gelose is then mixed in an aqueous medium with previously produced calcium alginate, the modified gelose has such affinity for the calcium in the calcium alginate that the gelose residue unites with the calcium alginate to form the more complex metal-organic compound gelose calcium alginate. The gelose calcium alginate that is thus produced has properties that are much different from the properties either of gelose or of calcium alginate. More particularly, the new product, while containing calcium is perfectly soluble in water and is highly resistant to the coagulating action of metal ions. The product has remarkable stability over a wide range of pH values, is very stable under heat, and is far more resistant to degradation by hydrolysis than algin or most of the vegetable gums.

The modification of the gelose so as to make it capable of reacting with calcium alginate to produce gelose calcium alginate will first be described. It is a feature of this invention that the gelose is modified by use of a cation exchange material, of which many are known, whereby the calcium naturally contained in the gelose is removed and whereby a cation having less affinity for the gelose residue is replaced in the gelose residue, the calcium being taken up by the cation exchange material. If, for example, the cation exchange material operates on the sodium cycle, the sodium cation is taken up by the gelose residue. Alternatively, if the cation exchange material operates on the hydrogen cycle, the hydrogen cation is taken up by the gelose residue.

The precise change in molecular composition that takes place when gelose is subjected to a cation exchange material is not altogether understood. It is believed to be the case that when gelose is completely hydrolized by subjecting it, for instance, to heat in an aqueous medium, there is a liberation of calcium sulphate and sulphuric acid leaving a residue containing carragheenic or related acid that can be represented by the following formula:

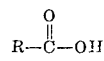

or the corresponding lactone,

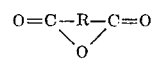

together with further degradation products having little or no colloidal activity.

When the gelose is subjected to the action of a cation exchange material, the formation of undesirable degradation products is minimized and the gelose residuum is believed to retain at least in part the sulphur containing groups. Thus, in the case of a cation exchange material operating on the sodium cycle, sodium carragheen sulphate or a related compound is believed to be formed which may be mixed with the products of hydrolysis above mentioned. In the case of a cation exchange material operating on a hydrogen cycle, the somewhat less stable sulpho carragheenic acid or related acid is believed to be formed which may be mixed with the products of hydrolysis above mentioned.

Regardless of the theory of molecular rearrangement, I have found that by employment of a cation exchange material the calcium can be separated from the gelose to form a modified gelose that is reactive with calcium alginate, while at the same time minimizing degradation of the gelose. While it is possible to eliminate calcium from gelose merely by hydrolysis under the influence of heat or by conventional chemical reactions, and while a small quantity of colloidal gelose residue can thus be produced from which the calcium cation has been removed and which is reactive with calcium alginate, there is also formed an excessively large proportion of undesirable degradation products.

Ion exchange materials are commonly referred to as zeolites and are extensively used, particularly for removal of water hardness and in other types of water purification. One type of cation exchange material that is desirable for use in the practice of this invention is carbonaceous zeolite. Carbonaceous zeolite material can be produced from various carbonaceous materials such as coal, lignite, wood, etc., by treatment with substances such as fuming sulphuric acid, chlorosulphonic acid or zinc chloride to produce a granular product which has cation exchange power and which can be regenerated for use on the sodium cycle or on the hydrogen cycle. Carbonaceous zeolites suitable for the practice of this invention are well known and commercially available.

Resinous zeolites are also suitable for use in the practice of this invention, e. g., the resinous zeolite material formed by reaction between a methylene body such as formaldehyde and a polyhydric phenolic body such as quebracho tannin (Patent No. 2,104,501). Such resins can operate as cation exchange materials either on the hydrogen cycle or on the sodium cycle and are well known and commercially available.

While certain examples of cation exchange materials have been mentioned above, it is apparent that any cation exchange material that has the capacity to remove calcium from gelose and yield for substitution in the gelose residue some other cation having less affinity for the gelose residue, can likewise be used. Moreover, while mention has been made of zeolite which operates on the sodium or hydrogen cycle, other cations may be exchanged for the calcium in gelose such as potassium, or ammonium. However, it is normal practice to use the zeolite either on the sodium or on the hydrogen cycle.

The gelose can be treated with the zeolite material by first removing the gelose from the marine plants containing it, as by extraction with warm water, and then contacting the aqueous extract containing dissolved gelose with the zeolite to accomplish the cation exchange in the usual way until the zeolite has become spent. The resulting solution of modified gelose can then be used for reaction with calcium alginate as described below, and the zeolite can be regenerated in the usual way for reuse.

While the gelose can be extracted from the marine plants prior to treatment of the aqueous gelose solution with a zeolite, I have found that it is preferable to extract the gelose from the marine plants directly in the presence of the cation exchange material, for in this manner a much higher yield is obtained and the degradation of the gelose which normally occurs during extraction is greatly reduced.

The following is a specific example of a typical operation whereby gelose is extracted from marine plants in the presence of a cation exchange material. A suspension is prepared which contains 100 parts of water (by weight), 3 parts, preferably powdered, of Irish moss (by dry weight) and 3 parts by weight of zeolite, e. g., a resinous zeolite of the type referred to above which is sold under the trade name Amberlite IR-100 and which is produced for operation on the sodium cycle. The quantity of water above mentioned will ordinarily be found to be suitable but may be varied in order to give to the aqueous mass the viscosity that is regarded as best suited for subsequent operations. After the suspension has been prepared, it is slowly heated to a temperature of about 90-95° C., preferably employing mild agitation, and the suspension is maintained at this temperature for about one hour in order to accomplish as complete liberation as possible of the gelose from the cellulose cells. The cellulose residue and the zeolite are then separated from the aqueous solution of the modified gelose by conventional methods such as filtering or centrifuging. If desired, the insoluble residue is washed with water for recovering the gelose material which it contains, and the washing solution can be mixed with the solution initially separated from the insoluble materials.

The solution which is removed from the insoluble materials contains the modified gelose, for during the extraction the zeolite has been effective to remove the calcium cation from the gelose, and to replace sodium in the gelose residue, when the zeolite operates on the sodium cycle. Employment of zeolite operating on the sodium cycle is normally preferred, since by the employment of the sodium the conditions have been found to be more favorable to recovery of a well polymerized product. The small quantities of sodium sulphate that are formed as a result of employment of a zeolite operating on the sodium cycle does not interfere with subsequent use of the modified gelose according to this invention. As stated above, the exact chemical nature of the modified gelose is not definitely known and may consist of a mixture of substances such as carragheen sodium sulphate, carragheenic acid, or a lactone. However, the modified gelose is characterized by much greater reactivity than gelose, and in particular has the special property of reacting with calcium alginate to form gelose calcium alginate. The modified gelose contained in the extracted solution can, if desired, be recovered in the dry state as by evaporation of the extracted solution or by coagulation with alcohol, but such recovery of the modified gelose in solid state is not necessary when the modified gelose subsequently is caused to react with calcium alginate, for this reaction is effected in an aqueous medium.

With regard to the insoluble residue containing cellulosic particles and spent zeolite from which the modified gelose has been extracted, the zeolite can be separated from the cellulosic material by conventional methods as by suspension in water and gravitational separation made possible because of differences in density. The recovered zeolite can be regenerated for reuse by conventional methods as by use of sodium chloride when the zeolite operates on a sodium cycle or by use of an acid when the zeolite operates on the hydrogen cycle.

When the gelose is contacted with a cation exchange material, the calcium is removed from the gelose and the sulphur containing radical of the gelose may remain in the gelose residuum or to some extent may be liberated as a small amount of sulphuric acid. Any such sulphuric acid that is liberated is not objectionable, as stated above. However, if desired, the modified gelose solution including any liberated sulphuric acid may be contacted with an anion exchange material which is adapted to take up sulphate with the result that the gelose residuum will consist principally of acid such as carragheenic acid or the corresponding lactone or the corresponding sodium salt depending upon whether or not the zeolite originally used operates on a hydrogen cycle or on a sodium cycle; and gelose so modified is also adapted for reaction with calcium alginate and is to be understood as falling within the term gelose modified by removing calcium and by replacing in the gelose residuum a cation having less affinity for the gelose residue than calcium. Anion exchange materials are known, e. g., the resin-like products of reaction of formaldehyde with an aromatic amine which are described in Patent No. 2,151,883.

The formation of calcium alginate may be accomplished in any suitable way. It has long been known that algin in an aqueous medium will react with soluble calcium salts to form insoluble calcium alginate. It is desirable, however, to prepare the calcium alginate so as to be free from calcium compounds other than calcium alginate, which other calcium compounds, if present, would react with the activated gelose residue prepared as above described. Accordingly, it is preferable that any algin which is used be slightly acidified so that it will occur in an aqueous medium having a pH of the order of 5 to 6 so as to avoid the production of more or less insoluble calcium salts (carbonates), and to cause the algin as disposed in such medium to react with a dissolved calcium salt, e. g., calcium chloride. Any suitable acid such as hydrochloric acid, acetic acid or the like may be used to produce the acidity, it being preferable to employ an acid which forms soluble salts of calcium. If the algin is reacted with calcium so as to completely saturate the carboxyl functions in the algin molecule, the amount of calcium salt used for reacting with the algin will be such that the calcium available for reaction with the algin will be about 10.5% of the weight of the algin. An excess of calcium salt can be used, if desired, but any such excess would not react with the algin and would be removed by washing the calcium alginate that is formed. The calcium alginate that is produced as above described is insoluble and is desirably washed with water so as to remove as much as possible of any soluble calcium salts and in order to obtain the calcium alginate in a high degree of purity. The calcium alginate after washing is merely drained to remove excess wash water and preferably is not dried.

The preparation of the gelose calcium alginate can readily be accomplished merely by mixing the modified gelose with the calcium alginate in an aqueous medium. For example, the solution containing modified gelose from which calcium has been removed may be placed in a tank equipped with an agitator, the solution being either hot or cold since the temperature has little influence on the reaction. The previously prepared calcium alginate is then mixed with the solution of modified gelose. After agitation for about 15 minutes the reaction is complete and a transparent solution is formed. The reaction can take place over a wide pH range, namely, between a pH of about 5 to a pH of about 8, but is preferably carried out to a pH of about 7 or under slightly acidic conditions, e. g., at a pH of about 6, since such solutions can be readily handled without special equipment and affords a product that is suitable for most purposes, e. g., use in milk products. If the resulting solution becomes highly viscous, the fluidity can be increased to facilitate subsequent recovery steps by including in the reaction mass a small quantity of sodium chloride in an amount that preferably does not exceed 5% of the combined dry weights of the modified gelose and the calcium alginate. However, the employment of salt is optional and may be omitted.

The viscous solution of gelose calcium alginate can be used as such, but for packaging and sale is ordinarily reduced to a dry state. This can be done merely by evaporating the solution to dryness or by coagulation with alcohol. When the gelose calcium alginate is coagulated with alcohol, I have found that it is preferable to do so by introducing an aqueous solution of the gelose calcium alginate in the form of a fine filament into a bath of alcohol of a concentration adapted to coagulate the gelose calcium alginate, thereby producing the gelose calcium alginate in filamentary form so that it can more readily be washed and dried. By way of illustration, an orifice of the order of $\frac{1}{30}$ inch in diameter has been found to be suitable.

When the gelose calcium alginate is coagulated by means of an alcohol, any aliphatic alcohol may be employed that is miscible with water. Such alcohols generally are those containing one, two or three carbon atoms such as ethyl alcohol, methyl alcohol, n-propyl alcohol, and isopropyl alcohol. The water soluble ether alcohols such as Cellosolve, methyl Cellosolve, Carbitol, and butyl Carbitol may also be employed. When reference is made herein to coagulation by means of alcohol, any of the alcohols above referred to, including the ether alcohols, is intended.

The gelose calcium alginate product produced as above described, when dissolved in water, produces a viscous transparent solution which normally has a pH of the order of 4.5 to 6.5 depending on the conditions of preparation. The product possesses the viscosity producing characteristics of algin, and in this respect differs from gelose per se which does not have this property. The product, while containing calcium, is readily soluble in water and has the advantage of having much greater resistance than algin to the action of acids and metallic salts in solution. Thus a solution of the gelose calcium alginate can be made decidedly acid without causing coagulation. For example, acidification until the pH is as low as about 1.5 to 2 merely results in slight gellifying tendency. Solutions of metallic salts also have a slight gellifying tendency on the gelose calcium alginate, but the amount of dissolved metallic salt required to afford this gellifying effect is very substantial and far in excess of the amount of metallic salt that is required to coagulate a solution of algin. This latter attribute of the new gelose calcium alginate product makes it admirably suited for stabilization of milk products, for it goes into solution in milk, either hot or cold, without coagulation or other effect on the calcium ions contained in milk. The new gelose calcium alginate product, therefore, is an excellent stabilizer of all dairy products such as ice cream mixes, chocolate milk beverages and the like.

More generally, the new gelose calcium alginate product can be used whenever it is desired to take advantage of the special physical properties of algin, with the added advantage that the new gelose calcium alginate product has wider fields of application since it is free from many of the disadvantages of algin that restrict the field of use of algin. Moreover, the new gelose calcium alginate has very desirable properties as an emulsifier, particularly in the case of oil-water emulsions.

In the reaction between the modified gelose from which the calcium has been removed and the calcium alginate, the reaction is believed to be induced by the affinity of the decalcified gelose for the calcium in the calcium alginate, namely, the tendency for the decalcified gelose to reform so as to contain the amount of calcium that is found in gelose as originally extracted from marine plants, which amount is in the neighborhood of 5% of the ethereal sulphate. However, the calcium contained in the calcium alginate does not seem to be removed from the calcium alginate molecule by the reaction but the gelose residue becomes part of the calcium alginate to form a highly complex metal-organic compound having the unique properties above referred to.

Since the reaction of the modified gelose with the calcium alginate results from a tendency of the gelose residue to take up an amount of calcium corresponding to the amount of calcium contained in unmodified gelose, this fact is of advantage in determining the amount of modified gelose that is appropriate for reaction with calcium alginate. For example, in the case of calcium alginate containing about 10.5% of calcium, it is desirable to react two parts by weight of modified gelose with each part of the calcium alginate since the modified gelose is adapted to react so as to take up calcium to the extent of approximately 5% of its weight. When the calcium alginate is caused to react with the modified gelose in the proportions indicated, there will be a virtually complete reaction to form gelose calcium alginate and there will be no residue either of unreacted modified gelose or of unreacted calcium alginate.

As I have pointed out in my copending application Ser. No. 476,488, filed February 18, 1943, for "Algin Compound and Preparation Thereof and Milk Products Containing Same" (Patent No. 2,400,834), it is possible to prepare calcium alginate containing less than the 10.5% by weight of calcium found in fully saturated calcium alginate. By following the procedure described in my aforesaid application, it is possible to obtain a calcium alginate containing any desired amount of calcium less than 10.5% and, as pointed out in said application, a calcium alginate containing calcium to the extent of about 3.1 to 3.5% by weight of the algin is water soluble. Any calcium alginate containing a lesser quantity of calcium than 10% can be used for reaction with the modified gelose to form gelose calcium alginate, for in any case there is linkage formed between the algin and the gelose residue by virtue of their common affinity for calcium. However, in reacting the modified gelose with calcium alginate it is desirable that the proportion of modified gelose be such that there will be complete reaction between the modified gelose and the calcium alginate used. For example, if the calcium alginate contains 5% by weight calcium, such calcium alginate is desirably reacted with an equal proportion by weight of modified gelose. More generally, the amount of calcium contained in the calcium alginate should be substantially 5% by weight of the modified gelose that is caused to react therewith so that neither the calcium alginate nor the modified gelose will be present in excess. While it is highly desirable that neither the calcium alginate nor the modified gelose be present in excess, this is not essential, for if the modified gelose is present in excess, the modified gelose will merely remain unreacted to the extent that it is in excess of the amount that will react with the calcium alginate. On the other hand, if the calcium alginate is present in excess, the excess will remain unreacted. However, since neither the modified gelose per se nor the calcium alginate per se has the desirable properties of the gelose calcium alginate reaction product, it is ordinarily desirable to employ proportions such that all of the modified gelose and calcium alginate are converted into the new reaction product.

While gelose from which calcium has been removed will readily react with calcium alginate to form the new gelose calcium alginate compound according to this invention, it may be mentioned that gelose as such from which the calcium cation has not been removed will not react with algin to form the gelose calcium alginate product of this invention. This is believed to be due to the fact that calcium has a much stronger affinity for the gelose than for the algin molecule and that the gelose is so stable that no reaction occurs under such conditions. However, when the calcium is removed from the gelose, the affinity of the modified gelose for calcium is such that the modified gelose reacts with calcium alginate to form the more complex gelose calcium alginate above described.

While this invention has been described particularly with reference to the reaction of decalcified gelose with calcium alginate, the decalcified gelose will likewise react in a similar way with alginates of the other alkaline earth metals such as barium and strontium and with alginates of heavy metals such as lead, zinc, iron, etc. to produce complex metal organic compounds of the character above described.

In addition to having special reactive properties with respect to metal alginates, the decalcified gelose is also reactive with other colloids containing an alkaline earth metal or heavy metal. Thus the decalcified gelose will react with calcium caseinate or with caseinates of other alkaline earth or heavy metals in the same manner that has been described above in connection with the reaction between decalcified gelose and calcium alginate. Calcium caseinate, for example, is normally insoluble, but when calcium caseinate is caused to react with decalcified gelose, the complex metal organic compound gelose calcium caseinate that is produced is soluble and has properties analogous to the properties of gelose calcium alginate. Calcium caseinate is similar to calcium alginate in that it may contain varying amounts of calcium in the calcium caseinate molecule. Therefore, it is preferable that the amount of calcium caseinate that is reacted with decalcified gelose contain an amount of calcium corresponding to about 5% by weight of the decalcified gelose.

While this invention has been described in connection with certain examples of the practice thereof, it is to be understood that this has been done for illustrative purposes and that the scope of this invention is defined by the language of the following claims.

I claim:

1. An ice cream mix containing the product of reaction between a substance selected from the group consisting of alginates and caseinates of the alkaline earth and heavy metals and gelose modified by the removal of the calcium cation of gelose and substitution in the gelose residue of a cation selected from the group consisting of sodium, potassium, ammonium and hydrogen.

2. An ice cream mix containing the gelose calcium alginate product of reaction between calcium alginate and gelose modified by removing the calcium cation of gelose and replacing in the gelose residue a cation selected from the group consisting of sodium, potassium, ammonium and hydrogen.

VICTOR CHARLES EMILE LE GLOAHEC.

REFERENCES CITED

The following references are of record in the file of this patent:

UNITED STATES PATENTS

| Number | Name | Date |
| --- | --- | --- |
| 2,400,834 | Le Gloahec | May 21, 1946 |
| 2,445,750 | Le Gloahec | July 27, 1948 |